US012568410B2

(12) United States Patent
Rune et al.

(10) Patent No.: US 12,568,410 B2
(45) Date of Patent: Mar. 3, 2026

(54) APERIODIC SYSTEM INFORMATION BROADCAST

(71) Applicant: Telefonaktiebolaget LM Ericsson (PUBL), Stockholm (SE)

(72) Inventors: Johan Rune, Lidingö (SE); Helka-Liina Määttänen, Espoo (FI); Chao He, Sollentuna (SE); Emre Yavuz, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 381 days.

(21) Appl. No.: 18/033,012

(22) PCT Filed: Oct. 22, 2021

(86) PCT No.: PCT/IB2021/059775
§ 371 (c)(1),
(2) Date: Apr. 20, 2023

(87) PCT Pub. No.: WO2022/084950
PCT Pub. Date: Apr. 28, 2022

(65) Prior Publication Data
US 2023/0397060 A1 Dec. 7, 2023

Related U.S. Application Data

(60) Provisional application No. 63/104,094, filed on Oct. 22, 2020.

(51) Int. Cl.
*H04W 36/00* (2009.01)
*H04W 36/08* (2009.01)

(52) U.S. Cl.
CPC ..... *H04W 36/0077* (2013.01); *H04W 36/083* (2023.05)

(58) Field of Classification Search
CPC ........................ H04W 36/0077; H04W 36/083
See application file for complete search history.

(56) References Cited

U.S. PATENT DOCUMENTS 11,930,484 B2 * 3/2024 Vaidya .............. H04W 72/0473
2019/0274091 A1 * 9/2019 Tang ..................... H04W 28/06
(Continued)

FOREIGN PATENT DOCUMENTS

WO 2019 136668 A1 7/2019

OTHER PUBLICATIONS

3GPP TR 38.811 V15.4.0 (Sep. 2020), 3rd Generation Partnership Project; Technical Specification Group Radio Access Network; Study on New Radio (NR) to support non-terrestrial networks (Release 15).
(Continued)

*Primary Examiner* — Barry W Taylor
(74) *Attorney, Agent, or Firm* — Baker Botts L.L.P.

(57) ABSTRACT

A method performed by a wireless device (110*b*, 110*c*) comprises receiving (612) system information (SI) broadcast from a network node, the SI broadcast received according to an aperiodic configuration. In particular embodiments, the aperiodic configuration comprises an initial period followed by a subsequent period, wherein a frequency of the SI broadcast during the initial period is greater than a frequency of the SI broadcast during the subsequent period. The initial period may occur when a satellite takes over coverage of a geographical area in which the wireless device is located, and the subsequent period may occur while the satellite maintains coverage of the geographical area in which the wireless device is located.

18 Claims, 13 Drawing Sheets

600

612 – receive system information (SI) broadcast from a network node, the SI broadcast received according to an aperiodic configuration 614 – performing one or more operations based on the received system information

(56) References Cited

U.S. PATENT DOCUMENTS

| | | | | | |
|---|---|---|---|---|---|
| 2023/0179293 | A1* | 6/2023 | Hwang | | H04W 48/16 |
| | | | | | 455/12.1 |
| 2023/0179294 | A1* | 6/2023 | Kuang | | H04B 7/2041 |
| | | | | | 370/316 |
| 2023/0362793 | A1* | 11/2023 | Cao | | H04B 7/18513 |

OTHER PUBLICATIONS

3GPP TSG-RAN WG2 Meeting #107bis; Chongqing, China; Oct. 14-18, 2019; Agenda Item: 6.2.3.5; Source: Charter Communications; Title: System Information Transmission Enhancements in NR-U (R2-1913653 (Revision of R2-1911104)).
3GPP TSG-RAN WG2 #107; Prague, Czech Republic, Aug. 26-30, 2019; Agenda Item: 11.6.4.1.1; Source: Ericsson, Nokia, Nokia Shanghai Bell; Title: Feeder link switch for regenerative and transparent NTN LEO scenarios (Tdoc R2-1911623).
3GPP TSG-RAN WG2 #101bis; Sanya, China, Apr. 16-20, 2018; Agenda Item: 9.8.5; Source: Ericsson; Title: Positioning assistance data segmentation and grouping (R2-1805255).
3GPP TSG RAN meeting #80; La Jolla, USA, Jun. 11-14, 2018; Source: Thales; Title: Study on solutions evaluation for NR to support Non Terrestrial Network; Agenda Item: 9.1.17—Study on solutions evaluation for NR to support Non Terrestrial Network, moderator: Thales (RP-181370).
3GPP TSG-RAN WG2 Meeting #107; Prague, Czech, Aug. 26-30, 2019; Source: ZTE Corporation, Sanechips; Title: Consideration on System Information Update in NTN; Agenda Item: 11.6.4.2 (R2-1909264).
3GPP TSG-RAN WG2 Meeting #111, Electronic, Aug. 17-28, 2020; Source: ZTE Corporation, Sanechips; Title: Consideration on system information and cell (re)selection in NTN; Agenda item: 8.10.3.1 (R2-2006872).
PCT International Search Report issued for International application No. PCT/IB2021/059775—Feb. 9, 2022.
PCT Written Opinion of the International Searching Authority issued for International application No. PCT/IB2021/059775—Feb. 9, 2022.

* cited by examiner

600

612 – receive system information (SI) broadcast from a network node, the SI broadcast received according to an aperiodic configuration 614 – performing one or more operations based on the received system information

650

652 – broadcast system information (SI) according to an aperiodic configuration

654 – determining an aperiodic configuration for broadcasting system information

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

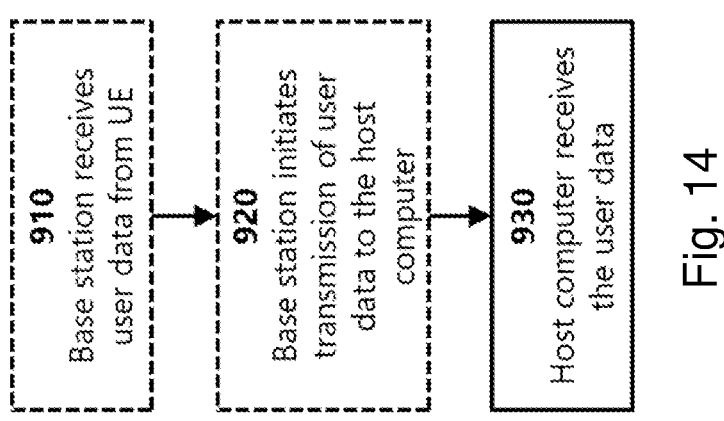

910
Base station receives user data from UE

920
Base station initiates transmission of user data to the host computer

930
Host computer receives the user data

Fig. 14

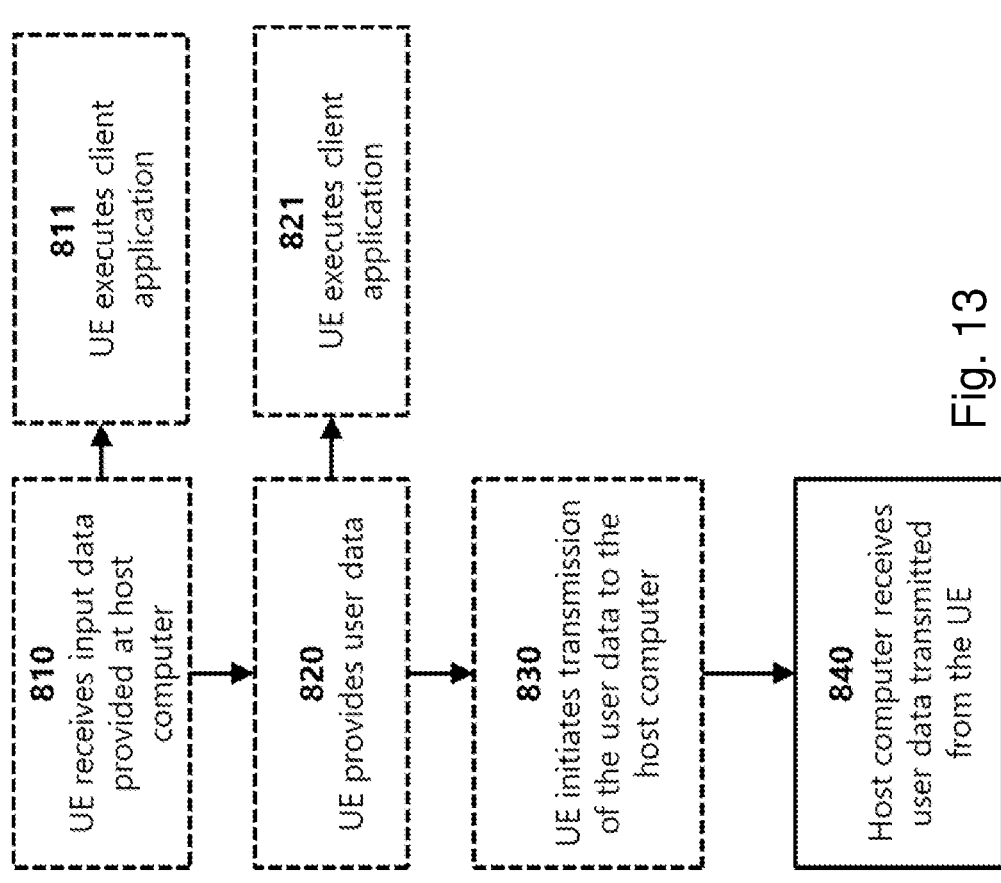

811
UE executes client application

821
UE executes client application

810
UE receives input data provided at host computer

820
UE provides user data

830
UE initiates transmission of the user data to the host computer

840
Host computer receives user data transmitted from the UE

Fig. 13

APERIODIC SYSTEM INFORMATION BROADCAST

PRIORITY

This nonprovisional application is a U.S. National Stage Filing under 35 U.S.C. § 371 of International Patent Application Serial No. PCT/IB2021/059775 filed Oct. 22, 2021 and entitled "APERIODIC SYSTEM INFORMATION BROADCAST" which claims priority to U.S. Provisional Patent Application No. 63/104,094 filed Oct. 22, 2020, both of which are hereby incorporated by reference in their entirety.

TECHNICAL FIELD

Embodiments of the present disclosure are directed to wireless communications and, more particularly, to aperiodic system information (SI) broadcast.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) specifications include the Evolved Packet System (EPS). EPS is based on the long-term evolution (LTE) radio network and the Evolved Packet Core (EPC). It was originally intended to provide voice and mobile broadband (MBB) services, but it has continuously evolved to broaden its functionality. For example, Narrowband Internet-of-Things (NB-IoT) and LTE for machines (LTE-M) are part of the LTE specifications and provide connectivity to massive machine type communications (mMTC) services.

3GPP also includes the 5G system (5GS). This new generation radio access technology is intended to serve use cases such as enhanced mobile broadband (eMBB), ultra-reliable and low latency communication (URLLC), and mMTC. The 5G specification includes the New Radio (NR) access stratum interface and the 5G Core Network (5GC). The NR physical and higher layers reuse parts of the LTE specification and add components as needed for the new use cases.

3GPP is also working to prepare NR for operation in a Non-Terrestrial Network (NTN) (see 3GPP Technical Report (TR) 38.811). In parallel, the interest to adapt LTE for operation in NTN is growing. As a consequence, 3GPP is considering introducing support for NTN in both LTE and NR.

A satellite radio access network usually includes the following components: a gateway that connects the satellite network to a core network; a satellite (e.g., a space-borne platform); a terminal (e.g., user equipment (UE)); a feeder link between the gateway and the satellite; and a service link between the satellite and the terminal. The link from gateway to terminal is often referred to as the forward link, and the link from terminal to gateway is often referred to as the return link.

Depending on the orbit altitude, a satellite may be categorized as low Earth orbit (LEO), medium Earth orbit (MEO), or geostationary (GEO) satellite. LEO includes typical heights ranging from 250-1,500 km, with orbital periods ranging from 90-130 minutes. MEO includes typical heights ranging from 5,000-25,000 km, with orbital periods ranging from 2-14 hours. GEO includes heights at about 35,786 km, with an orbital period of 24 hours.

Satellite systems tend to have significantly higher path loss than terrestrial networks due to their significant orbit height. Overcoming the path loss often requires the access and feeder links to be operated in line-of-sight conditions and the UE to be equipped with an antenna offering high beam directivity.

A communication satellite typically generates several beams over a given area. The footprint of a beam is usually an elliptic shape, which has been traditionally considered as a cell. The footprint of a beam is also often referred to as a spotbeam. The footprint of a beam may move over the earth surface with the satellite movement or may be earth fixed with a beam pointing mechanism used by the satellite to compensate for its motion. The size of a spotbeam depends on the system design, which may range from tens of kilometers to a few thousands of kilometers. FIG. 1 illustrates an example satellite network architecture with bent pipe transponders.

In comparison to the beams observed in a terrestrial network, the NTN beam may be very wide and may cover an area outside of the area defined by the served cell. A beam covering adjacent cells will overlap and cause significant levels of intercell interference. A typical approach for overcoming the large levels of interference in the NTN involves configuring different cells with different carrier frequencies and polarization modes.

3GPP TR 38.821 captures the idea that ephemeris data should be provided to the UE, for example, to assist with pointing a directional antenna (or an antenna beam) towards the satellite, and to calculate a correct Timing Advance (TA) and Doppler shift. Although procedures on how to provide and update ephemeris data have not yet been studied in detail, one option is to broadcast ephemeris data in the system information.

A satellite orbit can be fully described using 6 parameters. A user can choose exactly which set of parameters to use; many different representations are possible. For example, the set of parameters $(a, \varepsilon, i, \Omega, \omega, t)$ is often used in astronomy. Here, the semi-major axis "a" and the eccentricity "$\varepsilon$" describe the shape and size of the orbit ellipse; the inclination "i," the right ascension of the ascending node "$\Omega$," and the argument of periapsis "$\omega$" determine its position in space, and the epoch "t" determines a reference time (e.g., the time when the satellites moves through periapsis).

This set of parameters is illustrated in FIG. 2. In FIG. 2, the periapsis refers to a point where the orbit is nearest to Earth, the first point of Aries refers to the direction towards the sun at the March equinox, and the ascending node refers to the point where the orbit passes upwards through the equatorial plane.

As an example of a different parametrization, the two-line element sets (TLEs) use mean motion "n" and mean anomaly "M" instead of a and t. A completely different set of parameters is the position and velocity vector (x, y, z, $v_x$, $v_y$, $v_z$) of a satellite. These are sometimes called orbital state vectors. They can be derived from the orbital elements and vice versa because the information they contain is equivalent. All these formulations (and many others) are possible choices for the format of ephemeris data to be used in NTN. To enable further progress, the format of the data should be agreed upon.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another aspect captured in 3GPP TR 38.821 is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit, for example, the update frequency may range from multiple times a day (e.g., for satellites on very low orbits which are exposed to strong atmospheric drag and need to perform correctional maneuvers often) to weekly (e.g., for satellites on relatively higher orbits or satellites that are exposed to less atmospheric drag).

So, while it seems possible to provide the satellite position with the required accuracy, care needs to be taken to meet these requirements, e.g., when choosing the ephemeris data format or when choosing the orbital model to be used for the orbital propagation.

System information (SI) is an important function in cellular communication systems. It provides the wireless devices (e.g., UEs) with the information needed to access the network and to perform other functions, such as reselecting between cells and receiving Multimedia Broadcast Multicast Services (MBMS) transmissions in a cellular network operating in accordance with a 3GPP standard. In addition, in 3GPP cellular systems the system information mechanism is used for conveying Public Warning System messages, such as Earthquake and Tsunami Warning System (ETWS) messages and Commercial Mobile Alert System (CMAS) messages in 3GPP cellular communication systems.

In LTE, the system information is provided using periodic broadcasting in each cell. The SI is divided into a Master Information Block (MIB) and a number of System Information Blocks (SIBs). The MIB and SIB1 are broadcast with periods that are fixed in the standard. The other SIBs are broadcast with different periods, as configured in SIB1.

For the 5G system referred to as New Radio (NR) (where the RAN is referred to as Next Generation Radio Access Network (NG-RAN) and the core network is referred to as Next Generation Core (NGC)), 3GPP has partly changed the principles for distribution of system information (SI) that are used in LTE.

For NR, the SI is separated into "minimum SI" and "other SI," where the minimum SI is the SI that is required to access the cell and, in the case of NR stand-alone mode (i.e., not in dual connection configuration with LTE), the minimum SI also contains scheduling information for the SIB s of the other SI. The minimum SI consists of the Master Information Block (MIB) and System Information Block type 1 (SIB1). SIB1 is also referred to as "Remaining Minimum System Information" (RMSI).

At least in NR stand-alone mode, the minimum SI is periodically broadcast in a cell, while the other SI may be either periodically broadcast or delivered on-demand, triggered by a request from a UE. The granularity of the division into periodically broadcast SI and on-demand SI is on the level of SI messages. Whether a certain SI message is periodically broadcast or provided on-demand is indicated in SIB1 (using the si-BroadcastStatus parameter). A UE in radio resource control (RRC) idle (RRC_IDLE), inactive (RRC_INACTIVE), or connected (RRC_CONNECTED) state can request an on-demand SI message either using a random access preamble (referred to as the Msg1 based method) or using a random access message 3 (referred to as the Msg3 based method).

If random access preamble (Msg1) transmissions are used, there may be different preambles for requesting different SI message(s) (and consequently the SIB(s) allocated to the SI message(s)) of the other SI. The mapping between a random access preamble and the SI message to be requested is configured in SIB1. If random access message 3 (Msg3) transmissions are used, a UE may in such a message specify which SI message(s) (and consequently the SIB(s) allocated to the SI message(s)) of the other SI the UE wants the network to broadcast/transmit.

A request for an on-demand SI message triggers the network to broadcast the requested SI message for a limited time in accordance with the scheduling information associated with the concerned SI message in SIB1. The network will also transmit an acknowledgement message to the requesting UE. For the Msg1 based request method, the network responds with an acknowledging random access message 2 (Msg2). For the Msg3 based requests method, the network responds with an acknowledging random access message 4 (Msg4).

Periodic broadcast of system information (SI) is designed mostly according to the same principles in NR as in LTE. Similar to LTE, the Master Information Block (MIB) is transmitted in a fixed location in relation to the synchronization signals. The situation for SIB1 is slightly different in NR than in LTE. The periodicity of SIB1 is 160 ms, but it may be repeated a number of times within these 160 ms and the transmission configuration is indicated in the MIB. The remaining SIB s are scheduled in SIB1 and transmitted on the physical downlink shared channel (PDSCH) in the same way as in LTE.

Different SIBs can have different periodicities. SIBs with the same periodicity are allocated to the same SI message and every SI message is associated with a periodic SI-window within which the SI message should be transmitted. The SI-windows of the different SI messages have different periodicities, are non-overlapping and they all have the same duration. Note that the exact transmission occasion of an SI message is not configured, only the window within which it will be transmitted. To indicate that a PDSCH transmission contains an SI message, the cyclic redundancy check (CRC) of the physical downlink shared channel (PDCCH) scheduling downlink control information (DCI) which allocates the PDSCH transmission resources is scrambled with the System Information Radio Network Temporary Identifier (SI-RNTI).

A receiving UE leverages the non-overlapping property of the SI-windows to identify which SI message it receives (and thus which SIBs the SI message contains). The SI messages themselves do not include an indication to distinguish one SI message from the other. The principle of allocating SIBs to SI messages and scheduling of SI messages in SI-windows is illustrated in FIG. 3. In FIG. 3, each SI message is transmitted in its own SI-window, whose occurrence in time depends on the SI message periodicity and the SI message's position in the list in SIB1.

Note that every SI message has a configured schedule, irrespective of whether it is periodically broadcast or provided on-demand In the latter case, the scheduled broadcast occasions are used only when the network (e.g., gNB) has received a request for the concerned SI message.

The ASN.1 definitions of the SI scheduling related parameters in SIB1 and associated field descriptions are indicated below.

---

SI-SchedulingInfo information element

```
-- ASN1START
-- TAG-SI-SCHEDULINGINFO-START
SI-SchedulingInfo : :=                    SEQUENCE {
     schedulingInfoList                       SEQUENCE (SIZE (1..maxSI-Message))
OF SchedulingInfo,
     si-WindowLength                          ENUMERATED {s5, s10, s20, s40, s80,
s160, s320, s640,
                                                   s1280},
     si-RequestConfig                         SI-RequestConfig         OPTIONAL,
-- Cond MSG-1
     si-RequestConfigSUL                      SI-RequestConfig         OPTIONAL,
-- Cond SUL-MSG-1
     systemInformationAreaID                  BIT STRING (SIZE (24)) OPTIONAL,
-- Need R
     ...
}
SchedulingInfo : :=                      SEQUENCE {
     si-BroadcastStatus                          ENUMERATED {broadcasting,
notBroadcasting},
     si-Periodicity                           ENUMERATED {rf8, rf16, rf32, rf64,
rf128, rf256,
                                                   rf512},
     sib-MappingInfo                          SIB-Mapping
}
SIB-Mapping : :=                         SEQUENCE (SIZE (1..maxSIB) ) OF SIB-
TypeInfo
SIB-TypeInfo : : =                       SEQUENCE {
     type                                        ENUMERATED {sibType2, sibType3,
sibType4, sibType5,
                                                   sibType6,          sibType7,
sibType8, sibType9,
                                                   sibType10-v1610,
sibType11-v1610,
                                                   sibType12-v1610,
sibType13-v1610,
                                                   sibType14-v1610,
                                                   spare3,           spare2,
spare1,... },
     valueTag                                 INTEGER (0..31)          OPTIONAL,
-- Cond SIB-TYPE
     areaScope                                ENUMERATED {true}       OPTIONAL
-- Need S
}
-- TAG-SI-SCHEDULINGINFO-STOP
-- ASN1STOP
```

---

SchedulingInfo field descriptions areaScope

Indicates that a SIB is area specific. If the field is absent, the SIB is cell specific.

si-BroadcastStatus

Indicates if the SI message is being broadcasted or not. Change of si-BroadcastStatus should not result in system information change notifications in Short Message transmitted with P-RNTI over DCI (see clause 6.5). The value of the indication is valid until the end of the BCCH modification period when set to broadcasting.

si-Periodicity

Periodicity of the SI-message in radio frames. Value rf8 corresponds to 8 radio frames, value rf16 corresponds to 16 radio frames, and so on.

SI-RequestResources field descriptions ra-AssociationPeriodIndex
Index of the association period in the si-RequestPeriod in which the UE can send the
SI request for SI message(s) corresponding to this SI-RequestResources, using the
preambles indicated by ra-PreambleStartIndex and rach occasions indicated by ra-
ssb-OccasionMaskIndex.
ra-PreambleStartIndex
If N SSBs are associated with a RACH occasion, where N >= 1, for the i-th
SSB (i = 0, . . . , N-1) the preamble with preamble index = ra-PreambleStartIndex +
i is used for SI request; For N < 1, the preamble with preamble index =
ra-PreambleStartIndex is used for SI request.

SI-SchedulingInfo field descriptions si-RequestConfig
Configuration of Msg1 resources that the UE uses for requesting SI-messages for
which si-BroadcastStatus is set to notBroadcasting.
si-RequestConfigSUL
Configuration of Msg1 resources that the UE uses for requesting SI-messages for
which si-BroadcastStatus is set to notBroadcasting.
si-WindowLength
The length of the SI scheduling window. Value s5 corresponds to 5 slots, value s10
corresponds to 10 slots and so on. The network always configures si-WindowLength
to be shorter than or equal to the si-Periodicity.
systemInformationAreaID
Indicates the system information area that the cell belongs to, if any. Any SIB with
areaScope within the SI is considered to belong to this systemInformationAreaID. The
systemInformationAreaID is unique within a PLMN.

| Conditional presence | Explanation |
|---|---|
| MSG-1 | The field is optionally present, Need R, if si-BroadcastStatus is set to notBroadcasting for any SI-message included in SchedulingInfo. It is absent otherwise. |
| SIB-TYPE | The field is mandatory present if the SIB type is different from SIB6, SIB7 or SIB8. For SIB6, SIB7 and SIB8 it is absent. |
| SUL-MSG-1 | The field is optionally present, Need R, if this serving cell is configured with a supplementary uplink and if si-BroadcastStatus is set to notBroadcasting for any SI-message included in SchedulingInfo. It is absent otherwise. |

The basic principles for SI updates are the same in NR as in LTE. It is built around the concept of SI modification periods. With some exceptions, SI can only be updated at the border between two SI modification periods. Furthermore, a planned SI update has to be announced in the SI modification period prior to an actual SI update. Such announcements are performed using the paging mechanism, i.e., a notification on the paging channel is used to inform UEs in RRC_IDLE, UEs in RRC_INACTIVE and UEs in RRC_CONNECTED state about a coming system information change. In NR, notifications of coming SI updates are conveyed via so-called "Short Messages," i.e., included in the DCI (with the CRC scrambled with the paging RNTI (P-RNTI)) on the PDCCH, with or without an associated scheduled Paging message on the PDSCH. If the UE receives a DCI containing a Short Message including a systeminfoModification indication, the UE knows that the system information will change at the next SI modification period boundary.

A special case of SI update notification via a Short Message on the paging channel is when an etwsAndC-masIndication parameter in the Short Message indicates that a public warning system message (ETWS or CMAS) has been activated (or changed) in the SI. In this case, the UE knows that the update is applicable immediately and the UE should as soon as possible acquire and read the SIB(s) related to the concerned public warning. The UE has to read SIB1 to find out whether the notification concerns ETWS or CMAS.

SI updates are thus notified via the paging channel and consequently UEs have to monitor the paging channel, not only to receive paging targeting themselves, but also to receive possible SI update notifications (including public warning system (PWS) notifications). UEs in RRC_IDLE and RRC_INACTIVE state monitor their regular paging occasions (POs), i.e., one per paging discontinuous reception (DRX) cycle, and UEs in RRC_CONNECTED state can monitor any PO for SI update notifications, but should monitor at least one PO per default paging cycle (indicated by the defaultPagingCycle parameter in SIB1).

There currently exist certain challenges. For example, apart from on-demand SI (i.e., SI messages provided on request from a UE), broadcast of SI in NR and LTE is based on the concept of periodic broadcast. For most cases (e.g., most terrestrial networks), this works sufficiently because the need for the respective SIB s to be broadcast does not vary significantly in a predictable manner.

However, for non-terrestrial networks (NTNs), the need for SI broadcast may vary significantly in a predictable manner In particular, this is the case in the earth-fixed cell deployment where switching of the satellite responsible for covering a certain geographical (cell) area implies that some SI will be changed, in particular ephemeris data, if this is provided via the system information, further implying a greater need for UEs to acquire the (relevant parts of the) system information in conjunction with satellite switches (i.e., switches of the satellite responsible for covering a certain geographical (cell) area in the earth-fixed cell case.

A noteworthy observation in this context is that a UE may not be able to access a cell (due to an insufficiently accurate timing advance (TA) and Doppler shift frequency compensation estimations for random access preamble transmission) without reasonably accurate knowledge of the position and velocity of the satellite serving the cell, where both the position and velocity of the satellite can be derived from the satellite's ephemeris data. Note also that broadcasting the aforementioned ephemeris data on-demand would not be equally good as periodic broadcasting, because a UE would not know if and when this will happen and thus multiple UEs may request the concerned data to be broadcast, which would increase the signaling overhead and resource consumption in the network and the energy consumption in the UEs.

Furthermore, in the moving cell case, a similar increased need for SI acquisition may arise in conjunction with feeder link switches.

With a rigidly periodic broadcast of SI in a cell, the network may have to adapt the broadcast periodicity to the situations where the need for the SI is the greatest and its availability is the most critical, which could lead to, e.g., unnecessarily frequent broadcasts during most of the time. Unnecessarily frequent SI broadcast in turn means unnecessary signaling overhead and resource consumption. In addition, if the cellular network (e.g., an NR or LTE network) is operating in shared (unlicensed) spectrum (e.g., NR-U or LTE-LAA), frequent SI broadcasts will cause higher channel occupancy, which in turn leads to reduced performance in the network as well as in other networks/system sharing the same channel (frequency range) in the same area.

NTNs may be the prime example where the problems associated with the rigid periodic broadcast of SI manifests itself, but even in terrestrial networks, the need for the SI may vary, for example, with the time of day.

SUMMARY

Based on the description above, certain challenges currently exist with non-terrestrial networks (NTN) and system information (SI). Certain aspects of the present disclosure and their embodiments may provide solutions to these or other challenges.

For example, certain embodiments enable aperiodic broadcast of system information, e.g., in the form of irregular broadcast time patterns or periodically recurring irregular broadcast time patterns or periodically recurring periods (e.g., overlay-windows) where different SI broadcast scheduling configurations are used. Particular embodiments extend the SI scheduling (e.g., in the form of additional parameters) defined in the 3GPP RRC specification TS 38.331.

Aperiodic broadcast of system information facilitates adapting and tailoring of the time pattern of SI broadcasts to the variations in the need for it and the criticality of its availability, thereby avoiding having to adapt the SI broadcast periods to the "worst case" and thereby, in turn, enabling reduction of signaling overhead, resource consumption and (in operation in unlicensed, shared spectrum (NR-U)) reduced channel occupancy.

According to some embodiments, a method performed by a wireless device comprises receiving system information broadcast from a network node. The SI broadcast is received according to an aperiodic configuration.

In particular embodiments, the aperiodic configuration comprises one or more irregular broadcast time patterns. The one or more irregular broadcast time patterns may recur periodically. The aperiodic configuration may comprise periodically recurring overlay-windows.

In particular embodiments, the system information comprises ephemeris data or information related to cell selection or reselection.

In particular embodiments, the aperiodic configuration comprises an initial period followed by a subsequent period, wherein a frequency of the SI broadcast during the initial period is greater than a frequency of the SI broadcast during the subsequent period. The initial period may occur when a satellite takes over coverage of a geographical area in which the wireless device is located, and the subsequent period may occur while the satellite maintains coverage of the geographical area in which the wireless device is located. The initial period may occur immediately after a cell switch or a feeder link switch.

In particular embodiments, the aperiodic configuration comprises a one-shot overlay-window scheduled for a cell switch or feeder link switch such that the wireless device receives the SI broadcast according to a first schedule during the one-shot overlay-window and according to a second schedule outside of the one-shot overlay window.

According to some embodiments, a wireless device comprises processing circuitry operable to perform any of the wireless device methods described above.

A computer program product comprises a non-transitory computer readable medium storing computer readable program code, the computer readable program code operable, when executed by processing circuitry to perform any of the methods performed by the wireless device described above.

According to some embodiments, a method performed by a network node comprises broadcasting system information according to an aperiodic configuration. The aperiodic configuration may comprise one or more irregular broadcast time patterns. The one or more irregular broadcast time patterns may recur periodically. The aperiodic configuration may comprise periodically recurring overlay-windows.

According to some embodiments, a network node comprises processing circuitry operable to perform any of the network node methods described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments facilitate reduction of signaling overhead, resource consumption and (in operation in unlicensed, shared spectrum (NR-U)) reduced channel occupancy. In addition, particular embodiments facilitate adapting and tailoring of the time pattern of SI broadcasts to the variations in the need for it and the criticality of its availability.

BRIEF DESCRIPTION OF THE DRAWINGS

For a more complete understanding of the disclosed embodiments and their features and advantages, reference is now made to the following description, taken in conjunction with the accompanying drawings, in which:

FIG. 13 is a flowchart illustrating a method implemented in a communication system, according to certain embodiments; and FIG. 14 is a flowchart illustrating a method implemented in a communication system, according to certain embodiments.

DETAILED DESCRIPTION

Figure 1:
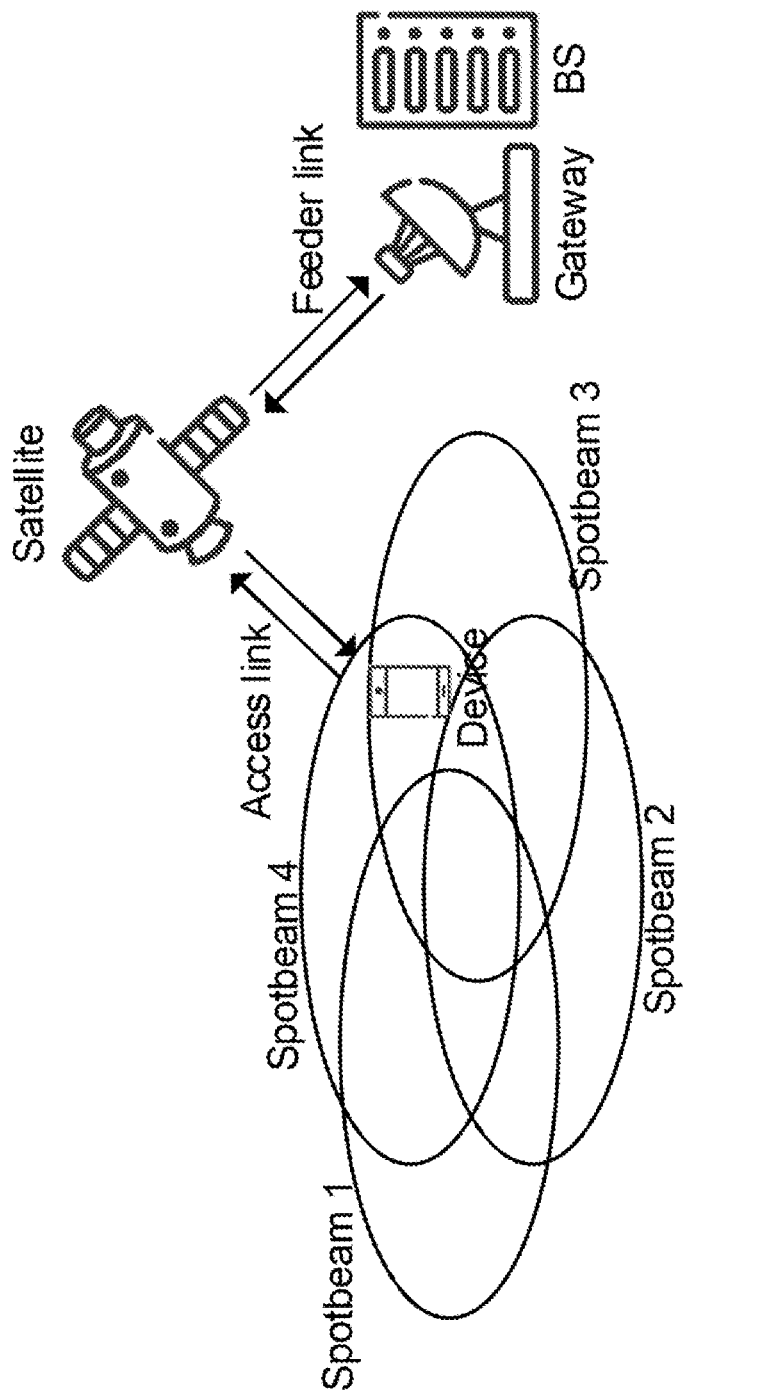
FIG. 1 illustrates an example satellite network architecture with bent pipe transponders.
Figure 2:
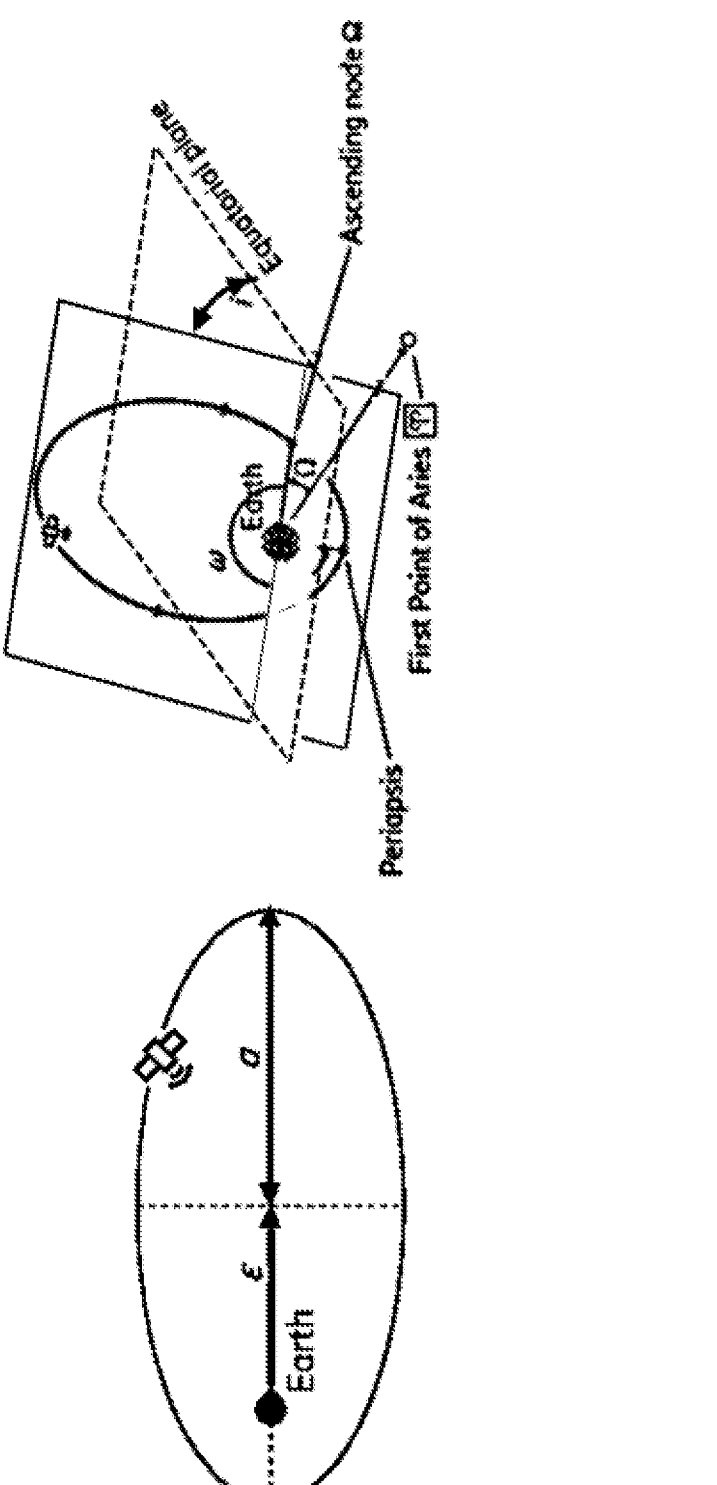
FIG. 2 illustrates an example of orbital elements.
Figure 3:
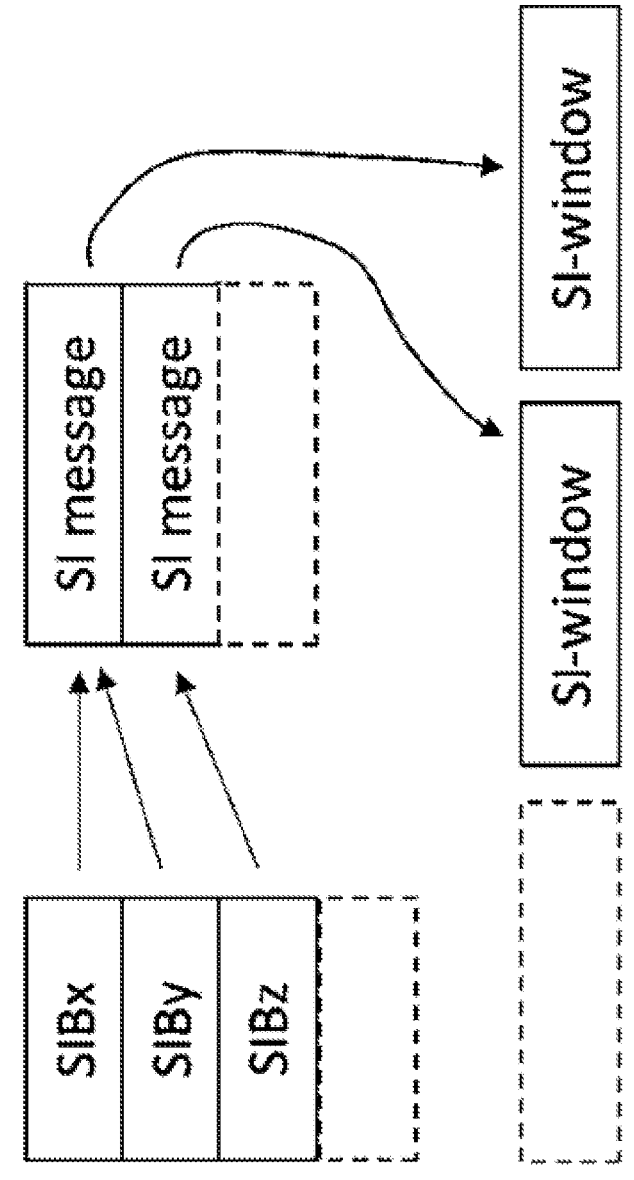
FIG. 3 illustrates allocation of SIBs to SI messages and scheduling of SI messages in SI-windows.

Based on the description above, certain challenges currently exist with non-terrestrial networks (NTN). Certain aspects of the present disclosure and their embodiments may provide solutions to these or other challenges. For example, certain embodiments enable aperiodic broadcast of system information, e.g., in the form of irregular broadcast time patterns or periodically recurring irregular broadcast time patterns or periodically recurring periods (e.g., overlay-windows) where different system information (SI) broadcast scheduling configurations are used.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Although particular problems and solutions may be described using new radio (NR) terminology, it should be understood that the same solutions apply to long term evolutions (LTE) and other wireless networks as well, where applicable.

As discussed above, the need for SI availability may vary with time, leading to unnecessarily frequent SI broadcasts during periods of lower need. To address this problem, certain embodiments of the present disclosure propose methods for aperiodic SI broadcast, where the SI broadcast pattern can be tailored, or better adapted, to the variations in the need for the SI.

As also discussed above, prime examples where this problem is emphasized are the predictably recurring switches of satellites responsible for covering a certain geographical cell area in the earth-fixed cell case in a non-terrestrial network (NTN). As a particular example, availability of accurate ephemeris data of the new satellite is critical in conjunction with the satellite switch.

Thus, to illustrate the particular embodiments, broadcast of satellite ephemeris data in NTN is used as an example. However, this should not be seen as a restriction of the applicability of the embodiments. On the contrary, adaptation or tailoring of the time pattern of SI broadcasts may be applicable and beneficial also in other situations and contexts and for other types of SI data. Another example is to fulfill emergency needs to switch to another satellite due to unexpected events, such as malfunctioning of a satellite or feeder link problems.

Thus, an observation is that provision of ephemeris data is important when a UE is about to access a new satellite (or access a gNB via a new satellite), e.g., when the UE is about to reselect to a cell served by a new satellite or when a new cell takes over the coverage of the UE location. However, as previously mentioned, the ephemeris data is just one example. Other information that may specifically need to be transmitted more often is other cell or other frequency related information for cell selection and reselection.

In general, as legacy UE are not supported in NTN system, the SI broadcasting may be redesigned to match better the need of NTN systems with phenomena like service link switch and feeder link switch happening. The new way of providing system information may be used for any SI sent in an NTN system.

Aperiodic SI broadcast can be beneficial not only for UEs in RRC_CONNECTED state upon, e.g., service link switch, so that such UEs are able to acquire system information required as soon as possible during handover; it can also be beneficial for UEs in RRC_IDLE or RRC_INACTIVE state to acquire system information fast and perform cell reselection before establishing an RRC connection, if the intention is to trigger random access procedure due to pending data in the uplink, considering that frequent link switches, especially in moving cells, may lead to interruptions and a UE may choose to delay establishing an RRC connection establishment if the expected time to be served in the camped cell is short.

In some embodiments, aperiodic broadcast of the expected time to be served of candidate cells or the serving cell may be employed to execute more accurate and efficient cell selection/reselection. Although the expected time to be served can be calculated at the UE, given sufficient information, another option is to broadcast such information (of the serving cell and/or of neighboring cell(s) or the cell which is about to take over the UE's servings cell's coverage area) in an earth-fixed cell scenario to save compute power at devices.

In some embodiments, aperiodic broadcast of a timestamp that is associated with the absolute transmission time at a gNB (via a satellite), where one non-exclusive example is the timestamp in SIBS, coupling with GNSS reference timing serves as an alternative to aperiodic broadcast of ephemeris data when it comes to calculation of a suitable timing advance (based on comparing the timestamp with GNSS reference timing) to reduce overhead in case applicable.

In the earth-fixed cell case, this observation may be leveraged to design a scheme where the ephemeris data is cast window to overwrite the upcoming broadcast pattern due to, e.g., urgent unpredictable needs.

As one example, the SI scheduling parameters may be extended with a configurable number of "overlay-windows", wherein each overlay-window has its own associated SI scheduling configuration and optionally a length/duration different from the other overlay windows (i.e., each overlay-window may have its own configurable length/duration). The overlay-windows may be non-overlapping and contiguous in an endless repetitive sequence (e.g., with the three configured overlay-windows OW1, OW2 and OW3, they would form a non-overlapping, contiguous (i.e., without gaps) repetitive sequence: OW1, OW2, OW3, OW1, OW2, OW3. An example ASN.1 definition may include the following:

```
OverlayWindowList        SEQUENCE (SIZE (1..maxNoOfOverlayWindows) ) OF
OverlayWindow
OverlayWindow                                          SEQUENCE {
    overlayWindowLength      ENUMERATED {rf64, rf256, rf1024, rf4096,
rf8192,                          rf16384,                    rf32768
rf65536,                         rf131072,                   rf262144},
    si-SchedulingInfo                                   SI-SchedulingInfo
}
``` more frequently broadcast in a cell when a new satellite takes over the coverage of the concerned geographical area, preferably replacing the old cell with a new cell covering (roughly) the same area (e.g., providing a new PCI), but possibly by "taking over" the old cell (i.e., keeping the old PCI).

This is, however, not possible to achieve in a smooth way with the current mechanisms for system information scheduling. The reason is that the SI scheduling is itself part of the system information (SIB1 is scheduled in the MIB and the SI messages carrying the other SIB s are scheduled in SIB1). That is, to change the scheduling, e.g., broadcast frequency, of a SIB, the scheduling information for the SI message carrying the SIB has to be updated in accordance with the rules and mechanisms for SI update, including announcement of a coming update via SI update notifications on the paging channel and update executions only occurring at the borders between SI modification periods.

Therefore, as one embodiment, to facilitate smooth provisioning of frequent broadcast of ephemeris data, or other SI in the NTN system, only when it is needed the most, e.g., during a first period, e.g., the initial period following a new satellite's take-over of the responsibility for coverage of a certain area, followed by sparser broadcasts in a second period, particular embodiments augment the current SI scheduling mechanisms (i.e., the available parameters) to allow other than plain periodic scheduling.

For example, the SI scheduling mechanisms may support scheduling of aperiodic or irregular broadcast of an SI message, or periodic repetition of a group of broadcast occasions, which (within the group) may form an irregular pattern or a regular pattern (such as a first set of broadcast occasions with one periodicity followed by a second set of broadcast occasions with another periodicity (which could be extended to more sets with further different periodicities)), or a combination of the these. Some embodiments may schedule completely aperiodic broadcast of an irregular group of broadcast depending on the deployment scenario, despite the potentially high scheduling cost. In another embodiment, a new broadcast pattern (periodic or aperiodic) may be re-scheduled within one scheduled SI/MIB broad- Note: "rf64" indicates 64 radio frames, "rf256" indicates 256 radio frames, "rf1024" indicates 1024 radio frames, etc.

In some embodiments, a reference timepoint, e.g., a particular HSFN, SFN and/or subframe, is provided for the first overlay-window in the sequence of consecutive, contiguous overlay-windows, thereby fixing, or relating, the repetitive sequence of overlay-windows to the time structure of the radio interface. Optionally, in the absence of such a configured reference timepoint, the start of the hyper frame with HSFN=0 may be used as the default reference timepoint. As an additional option, such a reference timepoint may be specified in the standard, e.g., being the start of the hyper frame with HSFN=0.

In some embodiments, a reference timepoint, e.g., a particular HSFN, SFN and/or subframe, is provided for any of the overlay windows with the configuration provided by the network via system information broadcast or dedicated signaling to indicate a starting point, or a fixed reference timepoint is specified to indicate the starting point, e.g., the start of the hyper frame where the configuration is provided. Optionally, such a reference timepoint may be hardcoded in a standard specification, e.g., set to the start of the hyper frame with HSFN=0.

When a hyper frame with a certain HSFN is used as a reference timepoint, the sequence of overlay-windows may be restarted every time this HSFN recurs. In particular, if the hyper frame with HSFN=0 is used as the reference timepoint, the sequence of overlay-windows could be restarted every time the HSFN wraps around (i.e., when the HSFN again becomes 0).

In some embodiments, the aperiodic SI broadcast is achieved in another way, more specifically targeting more frequent broadcasting in the initial period after a cell switch in the earth-fixed cell deployment case in NTN or a feeder link switch (in particular in the moving cell deployment case). In these embodiments, a one-shot overlay-window is used instead of a set of periodic overlay-windows, where this one-shot overlay-window covers the initial period following a cell switch or feeder link switch.

Thus, a one-shot overlay-window is configured to start at the cell or feeder link switch and during the duration of this one-shot overlay-window, a special SI broadcast scheduling is configured, while the regular SI broadcast scheduling (provided in SIB1 in accordance with legacy NR standard specifications (specifically in 3GPP TS 38.331)) applies outside the one-shot overlay-window. The point in time of the switch of cell and/or feeder link, and thus the start of the overlay-window, is then assumed to be known by the UE from broadcast/signaling of information related to the cell or feeder link switch. However, another option is to signal a reference timepoint, e.g., formulated using the radio inter- face's time structural terms, e.g., Hyper System Frame Number (HSFN), System Frame Number (SFN), subframe number, slot number and possibly symbol number.

When a satellite switch occurs, an overlap period may be used, during which both the old and the new satellite cover the concerned geographical area. Similarly, an overlap period may be used in conjunction with feeder link switches, during which the concerned satellite is connected to both the old and the new gateway. If such an overlap period is used, the one-shot overlay-window may, in some embodiments, start at the beginning of the overlap period. In an extension to these embodiments, the duration of the one-shot overlay- window may cover at least the entire overlap period. If the concerned satellite cannot be connected to both the old and new gateway simultaneously due to satellite incapability, the one-shot overlay window may instead start from the point in time when the new feeder link is established.

Further considering a scenario where there is a time period between the loss of the old feeder link and the establishment of the new feeder link, broadcasting complete system information between the moment the old feeder link switch is lost and when the new feeder link switch is connected may lead to an unfavorable situation, e.g., allow- ing a UE to mistakenly trigger a RA procedure to establish a connection before the satellite is connected to a new gateway. If part of the system information is provided to the satellite in a feeder link switch "handover command" (or if the regenerative payload architecture, with the gNB located in the satellite, is used), the above one-shot overlay window may, in some embodiments, start at a time earlier (with a margin) than the beginning of such a period. This would allow part of the system information available at the satellite before the new feeder link is established to be broadcast to UEs, to use some of the unused time resources when no feeder link connection is available. The margin value may be set as default in the system information or be pre-defined with later broadcasting to indicate to the users which margin value to use if the time when the new feeder link connection is established is already known to the UEs. Optionally, two one-shot overlay windows may be applied in such a sce- nario, e.g., one during the period where no feeder link is available and one starting when the new feeder link is established.

The principle of using a one-shot overlay window may be generalized to include a set of one or more one-shot overlay- windows (each with its own SI scheduling configuration), where these possibly multiple one-shot overlay-windows should be non-overlapping and follow each other in a contiguous sequence. As before, outside the one-shot over- lay-window(s), e.g., after the one-shot overlay-window(s), the regular SI schedule takes over.

As an extension to, or variation of, any of the above embodiments involving one or more overlay-window(s), an overlay-window is not shorter than the longest broadcast period of the broadcast SI. Or in other words, the overlay- window's internal SI scheduling information may not sched- ule a longer SI message periodicity than the length of the overlay-window. Or with yet other words (resulting in a slightly different variation), the SI scheduling information associated with an overlay-window must ensure that each scheduled SI message is broadcast at least once during the overlay-window.

In another embodiment, not all SI messages are scheduled for broadcast in every overlay-window. Thus, the broadcast SI content may vary between overlay-windows.

In some embodiments (possibly combined with any of the ones above), the mapping of SIBs to SI messages may differ between different overlay-windows. This may include that different SIB s are grouped together in the same SI message in different overlay-windows, that different numbers of SI-messages are used in different overlay-windows, that different SI-window durations are used in different overlay- windows and/or that different sets of SIBs are broadcast in different overlay-windows.

Note that in the above embodiments, the UE becomes aware of all the SI scheduling information by reading SIB1, including the SI scheduling information associated with each of one or more overlay-window(s) (if applicable), so that the UE knows beforehand which parts of the SI that will be broadcast in which time periods.

The above described embodiments should be seen as non-restrictive examples and that the concept of providing aperiodic or irregular time patterns for SI broadcast can be applied also in other contexts, e.g., other cellular networks, systems and technologies where broadcast of system infor- mation (or similar information enabling devices to operate in the network/system) or with other types of information in focus. Other than the above described means or tools for realizing the herein proposed aperiodic or irregular time patterns for SI broadcast can also be conceived, such as adding new parameters to the existing SI scheduling related parameters, e.g., additional offsets, additional regular or irregular offsets, SI-window size variations, inserted broad- cast gaps, modifying the order of SIB s within a SI message, using different sending order for SI messages (e.g., within an overlay-window), shifting of broadcasts or SI windows, inclusion of a SIB in more than one SI message, associating dual or multiple SI-window periodicities running in parallel for a certain SI message, associating alternating dual or multiple SI-window periodicities for a certain SI message, etc.

In some embodiments, the way the SI is broadcast in the cell is informed in the MIB. There are different ways to set the parameters in the above mentioned list, each parameter setting combination associated with an index and an index (in the form of a bit string) in the MIB to refer to the particular setting/combination of the parameters to apply or the way to broadcast the SI.

In some embodiments, a SI message including the ephem- eris data or any other system information/SIB subject to aperiodic broadcasting, is updated any time after a system information update notification is provided via a Short Message on the paging channel, i.e., included in the DCI (with the CRC scrambled with the P-RNTI) on the PDCCH, where the broadcast of that particular SI message follows one periodicity during a first period, yet another one in the following period(s) and so on.

In some embodiments, one of the periodicities, e.g., the second periodicity, is expected to overlap with the regular periodicity so that UEs that are unaware of the system information update notification (yet) would continue to receive the ephemeris data or system information using the regular scheduling information provided in SIB1. The scheduling information for aperiodic SI broadcast is pro- vided in SIB1 or any other SIB or captured in the specifications as a default value so that it can be enabled upon system information update notification.

Throughout this disclosure, the terms "beam" and "cell" may be used interchangeably, unless explicitly noted otherwise. Although certain embodiments have been described with reference to NTN, the methods proposed apply to any wireless network (e.g., any wireless network dominated by line-of-sight conditions). Certain embodiments (or portions thereof) may be implemented in one or more standards, such as 3GPP release 17+, 3GPP TS 38.331, and/or NR TR 38.821 Re1-16.

Figure 4:
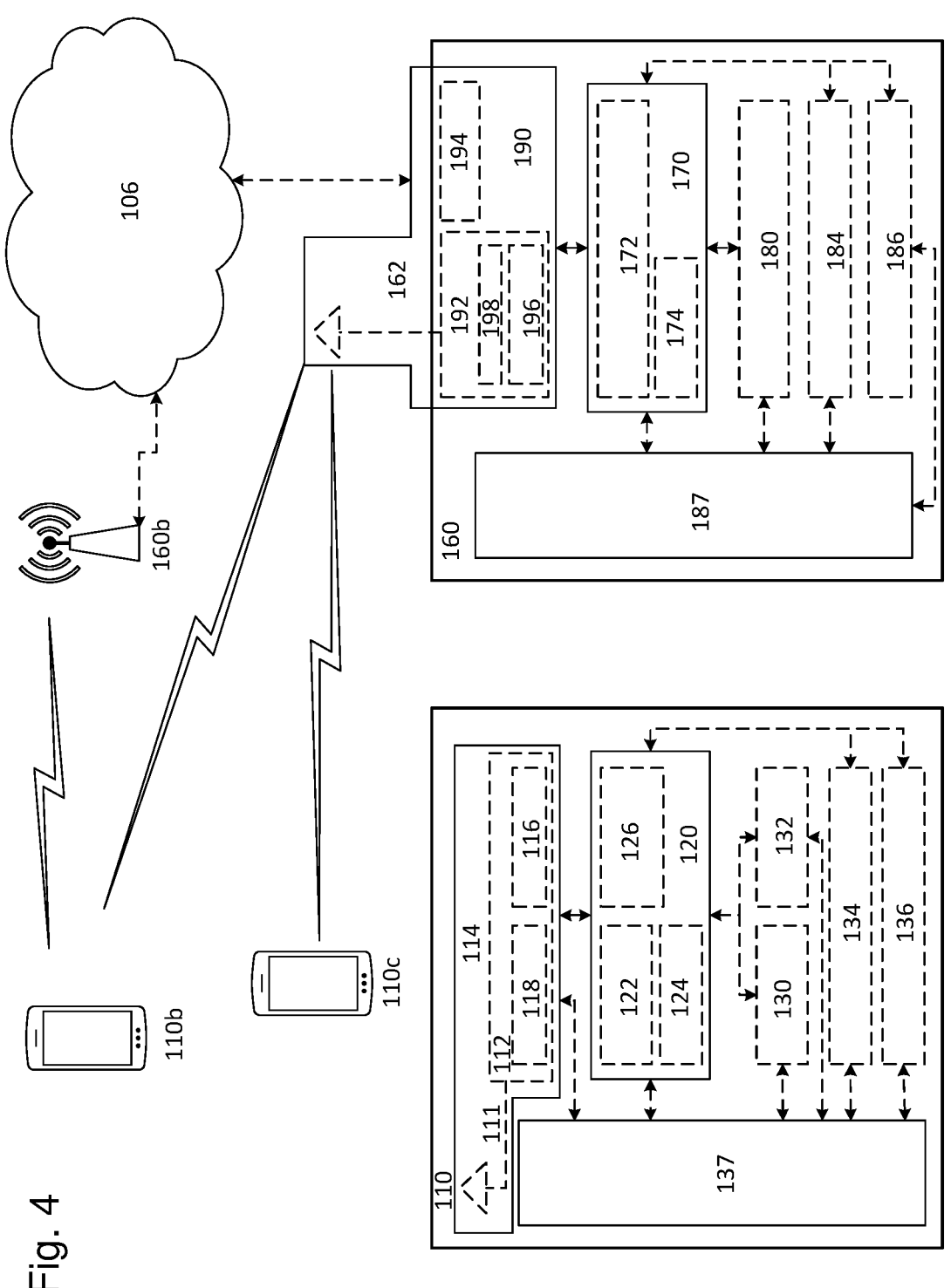
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs).

Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 5:
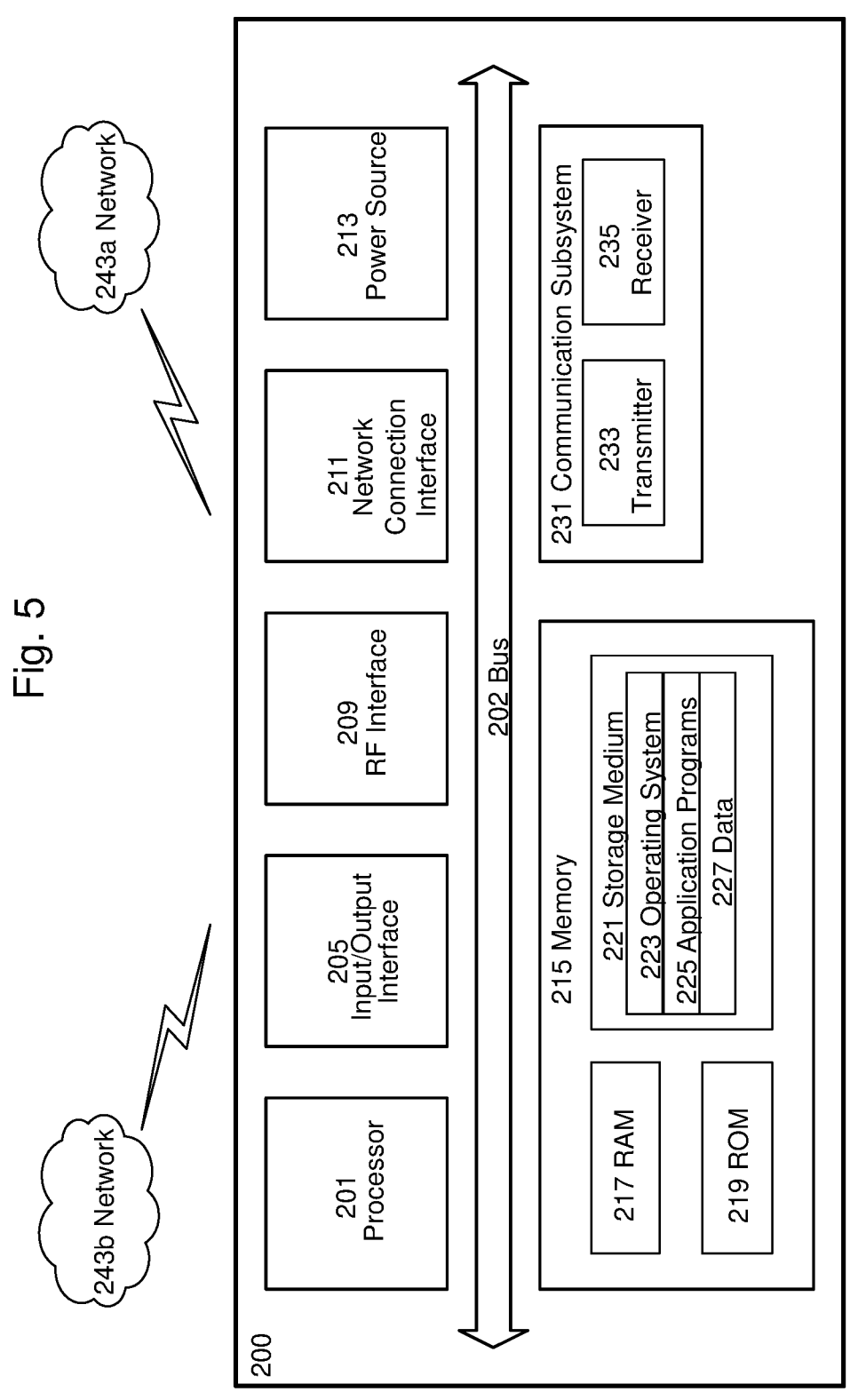
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6A:
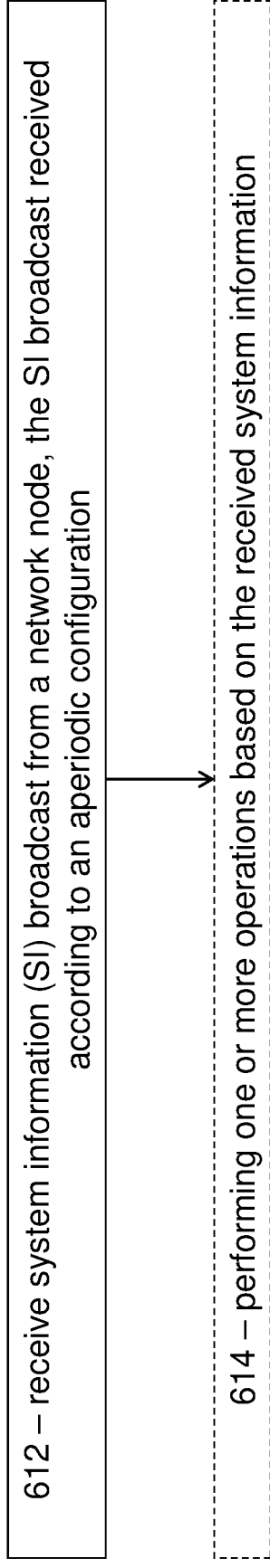
FIG. 6A is a flowchart illustrating an example method in a wireless device, according to certain embodiments.
Figure 6A:

FIG. 6A is a flowchart illustrating an example method in a wireless device, according to certain embodiments. In particular embodiments, one or more steps of FIG. 6A may be performed by wireless device 110 described with respect to FIG. 4.

The method begins at step 612, where the wireless device (e.g., wireless device 110) receives system information broadcast from a network node. The SI broadcast is received according to an aperiodic configuration. The system information may be received according to any of the embodiments and examples described herein.

For example, in particular embodiments, the aperiodic configuration comprises one or more irregular broadcast time patterns. The one or more irregular broadcast time patterns may recur periodically. The aperiodic configuration may comprise periodically recurring overlay-windows.

In particular embodiments, the system information comprises ephemeris data or information related to cell selection or reselection.

In particular embodiments, the aperiodic configuration comprises an initial period followed by a subsequent period, wherein a frequency of the SI broadcast during the initial period is greater than a frequency of the SI broadcast during the subsequent period. The initial period may occur when a satellite takes over coverage of a geographical area in which the wireless device is located, and the subsequent period may occur while the satellite maintains coverage of the geographical area in which the wireless device is located. The initial period may occur immediately after a cell switch or a feeder link switch.

In particular embodiments, the aperiodic configuration comprises a one-shot overlay-window scheduled for a cell switch or feeder link switch such that the wireless device receives the SI broadcast according to a first schedule during the one-shot overlay-window and according to a second schedule outside of the one-shot overlay window.

At step 614, the wireless device performs an operation based on the system information. For example, the wireless device may use ephemeris data to determine a position of a satellite, or may use the system information to perform a handover, etc.

Modifications, additions, or omissions may be made to method 600 of FIG. 6A. Additionally, one or more steps in the method of FIG. 6A may be performed in parallel or in any suitable order.

Figure 6B:
FIG. 6B is a flowchart illustrating an example method in a network node, according to certain embodiments.

FIG. 6B is a flowchart illustrating an example method in a network node, according to certain embodiments. In particular embodiments, one or more steps of FIG. 6B may be performed by network node 160 described with respect to FIG. 4.

The method begins at step 652, where the network node (e.g., network node 160) broadcasts system information according to an aperiodic configuration. The network node may broadcast the system information according to any of the embodiments and examples described herein.

At step 614, the network node may determine an aperiodic configuration for broadcasting system information. For example, the network node may determine the aperiodic configuration used in step 612, or the network node may determine that a new aperiodic configuration is needed based on particular events.

Modifications, additions, or omissions may be made to method 650 of FIG. 6B. Additionally, one or more steps in the method of FIG. 6B may be performed in parallel or in any suitable order.

Figure 7:
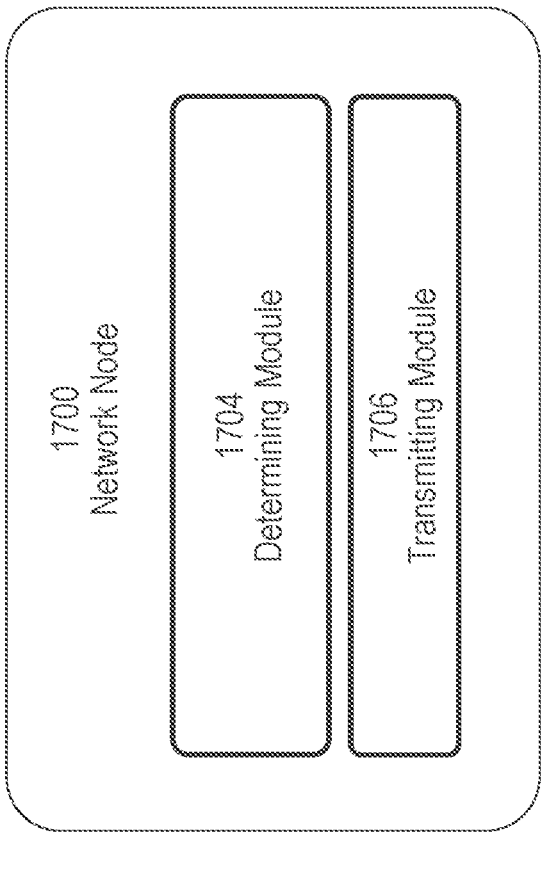
FIG. 7 illustrates a schematic block diagram of a wireless device in a wireless network, according to certain embodiments.

FIG. 7 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 1). Apparatuses 1600 and 1700 are operable to carry out the example methods described with reference to FIGS. 6A and 6B, respectively, and possibly any other processes or methods disclosed herein. It is also to be understood that the methods of FIGS. 6A and 6B are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, and any other suitable units of apparatus 1600 to perform corresponding functions according one or more embodiments of the present disclosure. Similarly, the processing circuitry described above may be used to cause determining module 1704, transmitting module 1706, and any other suitable units of apparatus 1700 to perform corresponding functions according one or more embodiments of the present disclosure.

As illustrated in FIG. 5, apparatus 1600 includes receiving module 1602 configured to receive aperiodic system information broadcasts according to any of the embodiments and examples described herein. Determining module 1604 is configured to determine what operations to perform with the system information according to any of the embodiments and examples described herein.

As illustrated in FIG. 5, apparatus 1700 includes determining module 1704 configured to determine an aperiodic configuration for broadcasting system information according to any of the embodiments and examples described herein. Transmitting module 1706 is configured to transmit aperiodic system information according to any of the embodiments and examples described herein.

Figure 8:
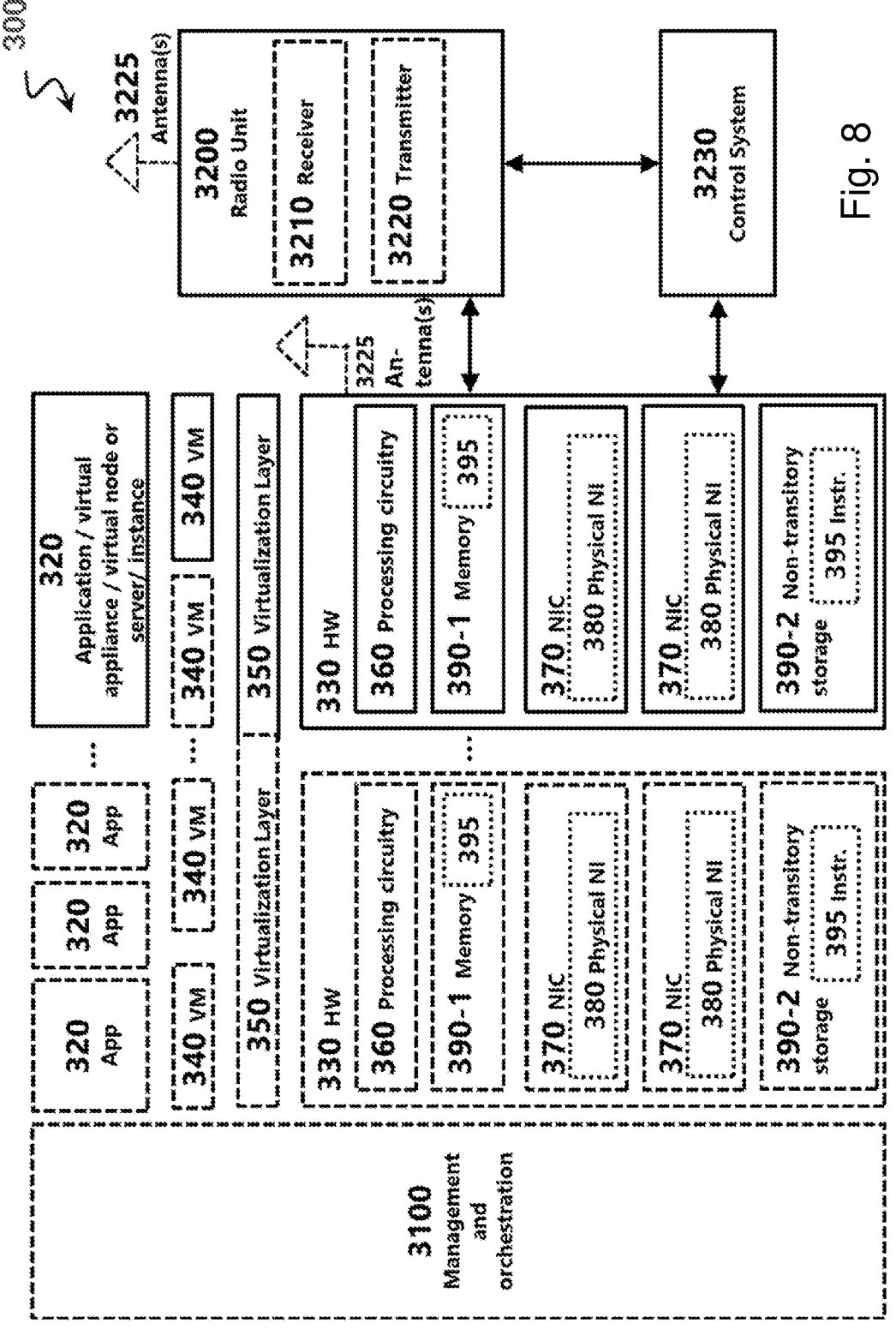
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 9:
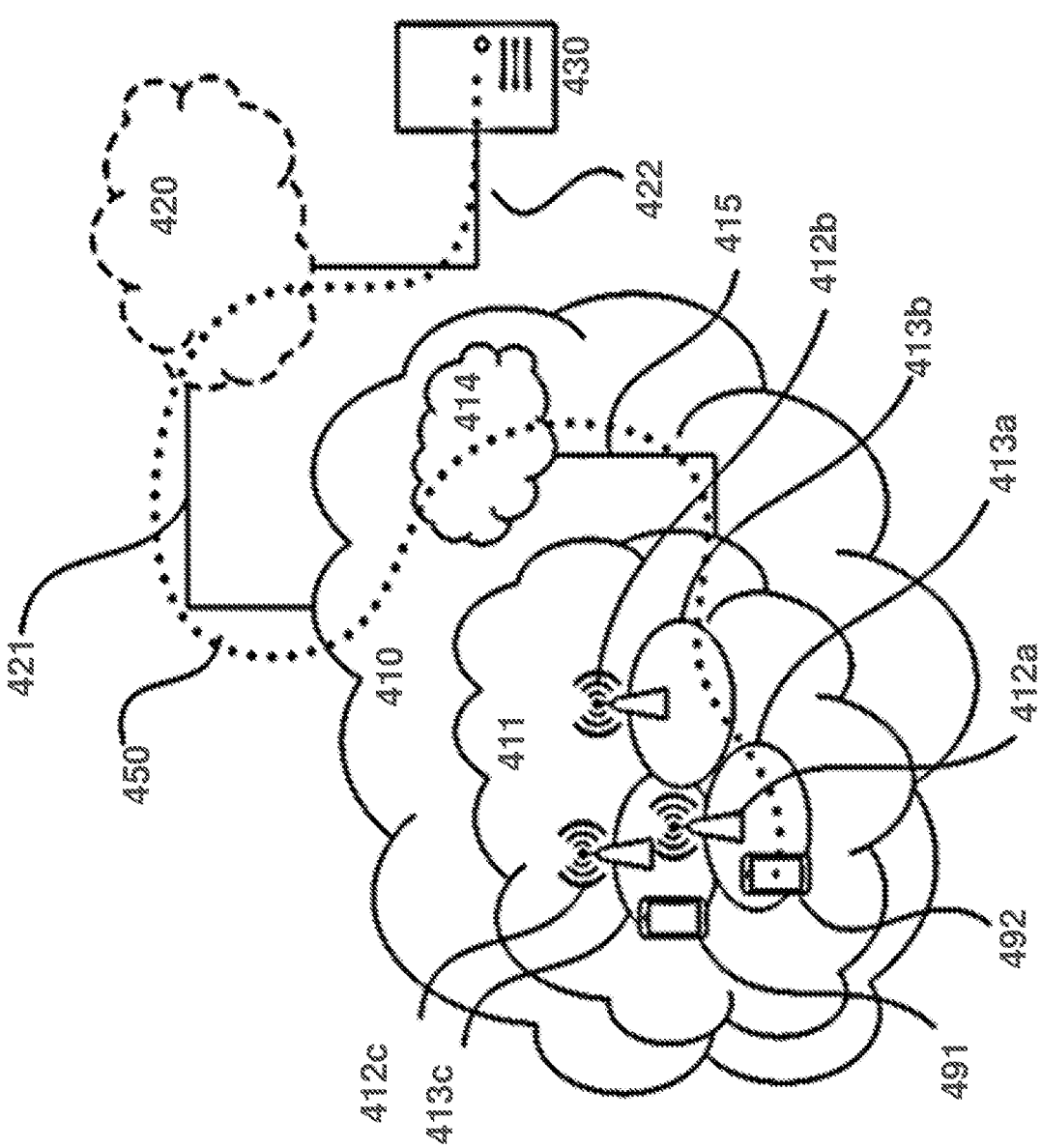
FIG. 9 illustrates an example telecommunication network connected via an intermediate network to a host computer, according to certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
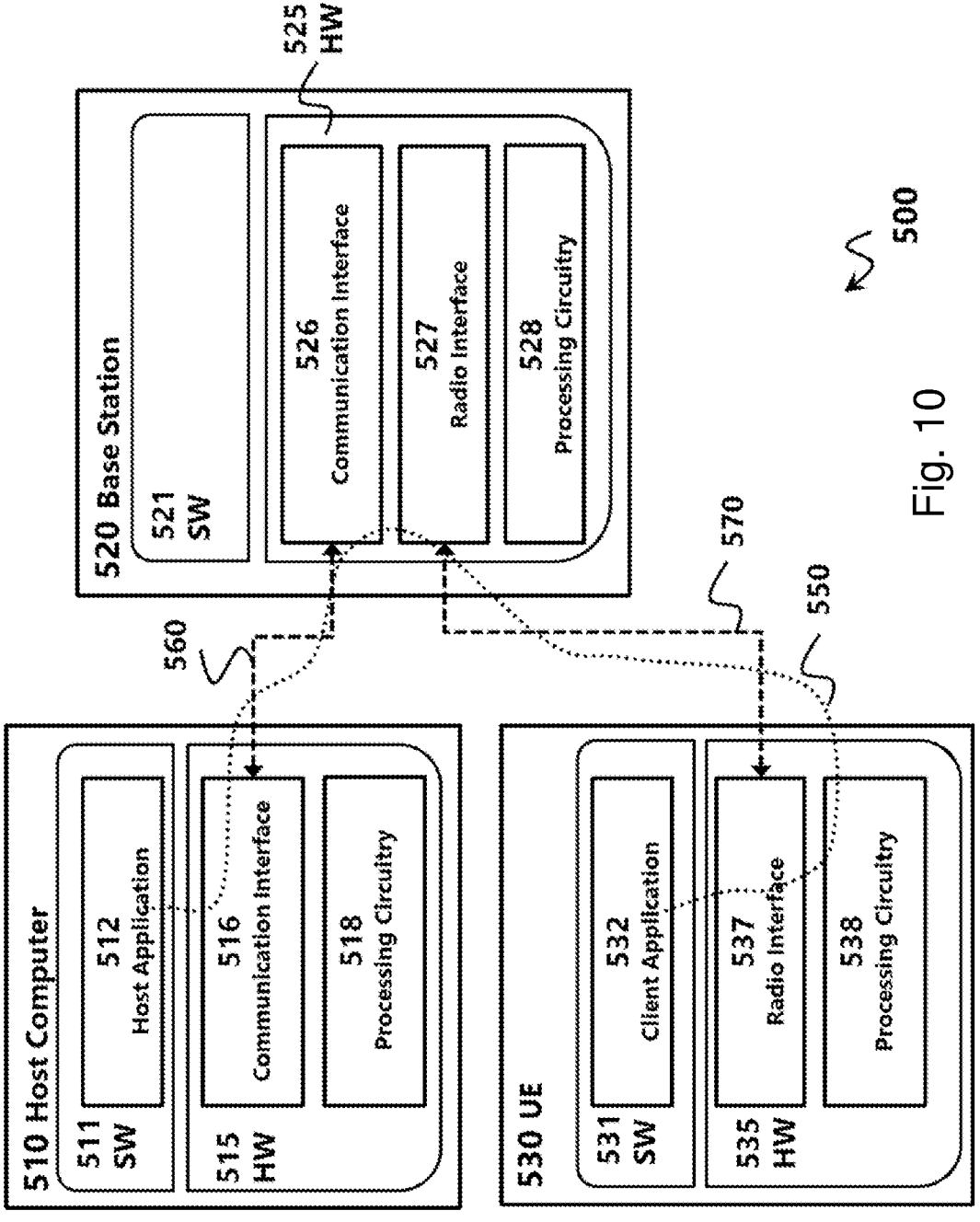
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIGURE may be similar or identical to host computer 430, one of base stations 412a, 412b, 412c and one of UEs 491, 492 of FIG. 4, respectively. This is to say, the inner workings of these entities may be as shown in FIG. 10 and independently, the surrounding network topology may be that of FIG. 4.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
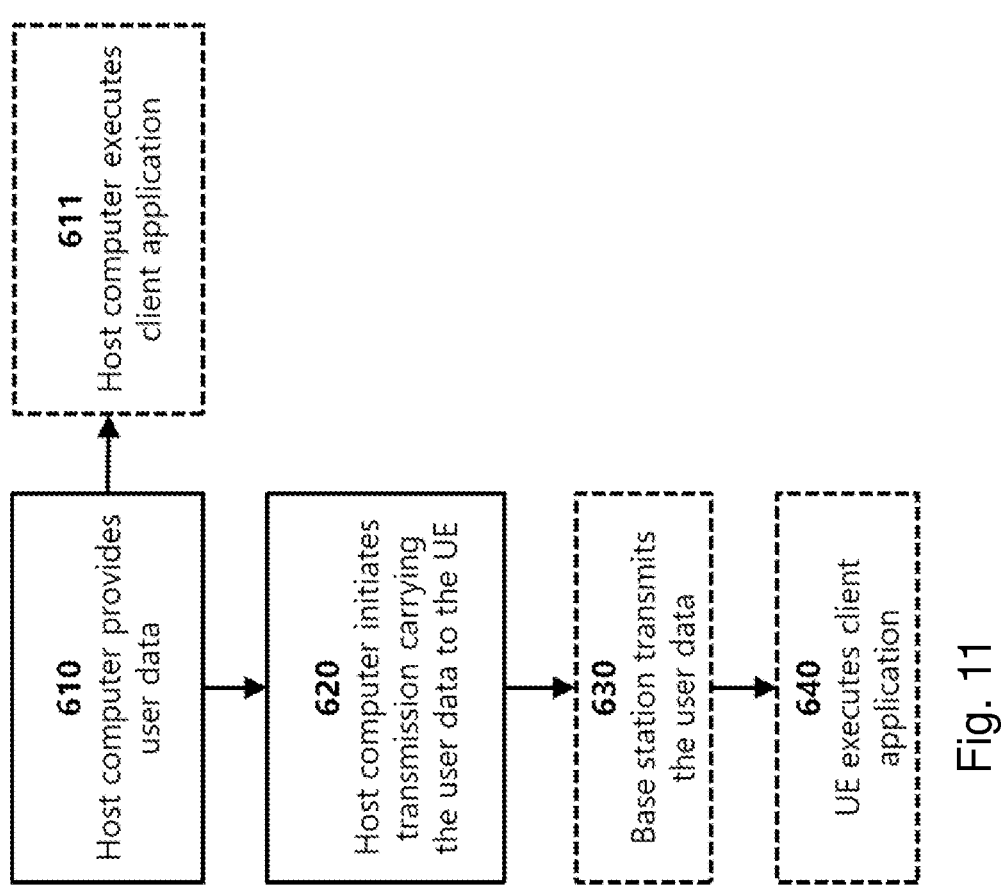
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
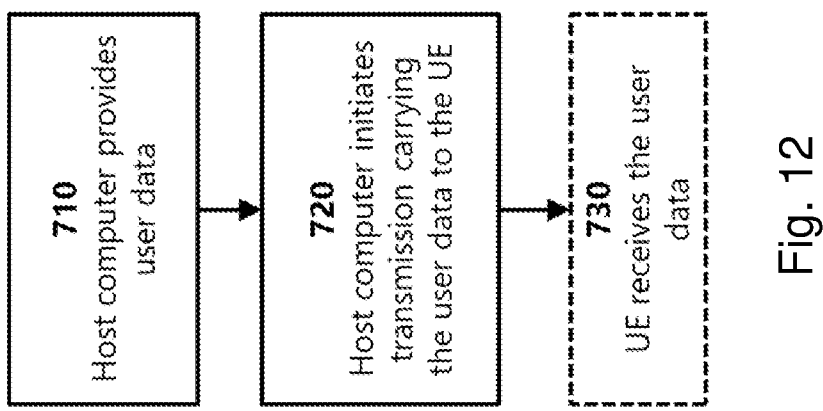
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device, the method comprising:
   receiving system information (SI) broadcast from a network node, the SI broadcast received according to an aperiodic configuration, wherein the aperiodic configuration comprises an initial period followed by a subsequent period, wherein a frequency of the SI broadcast during the initial period is greater than a frequency of the SI broadcast during the subsequent period, and wherein the initial period occurs when a satellite takes over coverage of a geographical area in which the wireless device is located or immediately after a cell switch or a feeder link switch.

2. A wireless device comprising processing circuitry operable to:
   receive system information (SI) broadcast from a network node, the SI broadcast received according to an aperiodic configuration, wherein the aperiodic configuration comprises an initial period followed by a subsequent period, wherein a frequency of the SI broadcast during the initial period is greater than a frequency of the SI broadcast during the subsequent period, and wherein the initial period occurs when a satellite takes over coverage of a geographical area in which the wireless device is located or immediately after a cell switch or a feeder link switch.

3. The wireless device of claim 2, wherein the aperiodic configuration comprises one or more irregular broadcast time patterns.

4. The wireless device of claim 3, wherein the one or more irregular broadcast time patterns recur periodically.

5. The wireless device of claim 2, wherein the aperiodic configuration comprises periodically recurring overlay-windows.

6. The wireless device of claim 2, wherein the system information comprises ephemeris data.

7. The wireless device of claim 2, wherein the system information comprises information related to cell selection or reselection.

8. The wireless device of claim 2, wherein the subsequent period occurs while the satellite maintains coverage of the geographical area in which the wireless device is located.

9. The wireless device of claim 2, wherein the aperiodic configuration comprises a one-shot overlay-window scheduled for a cell switch or feeder link switch such that the wireless device receives the SI broadcast according to a first schedule during the one-shot overlay-window and according to a second schedule outside of the one-shot overlay window.

10. A method performed by a network node, the method comprising:

broadcasting system information (SI) according to an aperiodic configuration, wherein the aperiodic configuration comprises an initial period followed by a subsequent period, wherein a frequency of the SI broadcast during the initial period is greater than a frequency of the SI broadcast during the subsequent period, and wherein the initial period occurs when a satellite takes over coverage of a geographical area or immediately after a cell switch or a feeder link switch.

11. A network node comprising processing circuitry operable to:

broadcast system information (SI) according to an aperiodic configuration, wherein the aperiodic configuration comprises an initial period followed by a subsequent period, wherein a frequency of the SI broadcast during the initial period is greater than a frequency of the SI broadcast during the subsequent period, and wherein the initial period occurs when a satellite takes over coverage of a geographical area or immediately after a cell switch or a feeder link switch.

12. The network node of claim 11, wherein the aperiodic configuration comprises one or more irregular broadcast time patterns.

13. The network node of claim 12, wherein the one or more irregular broadcast time patterns recur periodically.

14. The network node of claim 11, wherein the aperiodic configuration comprises periodically recurring overlay-windows.

15. The network node of claim 11, wherein the system information comprises ephemeris data.

16. The network node of claim 11, wherein the system information comprises information related to cell selection or reselection.

17. The network node of claim 11, wherein the subsequent period occurs while the satellite maintains coverage of the geographical area in which the wireless device is located.

18. The network node of claim 11, wherein the aperiodic configuration comprises a one-shot overlay-window scheduled for a cell switch or feeder link switch such that the wireless device receives the SI broadcast according to a first schedule during the one-shot overlay-window and according to a second schedule outside of the one-shot overlay window.

* * * * *